J. P. COPELAND.
FERTILIZER DEPOSITOR.
APPLICATION FILED DEC. 8, 1919.

1,374,881.

Patented Apr. 12, 1921.

Inventor
James P. Copeland.
By Beall & Fenwick
Attorneys

UNITED STATES PATENT OFFICE.

JAMES P. COPELAND, OF VINEMONT, ALABAMA, ASSIGNOR OF ONE-HALF TO WALTER L. GUTHRIE, OF CULLMAN, ALABAMA.

FERTILIZER-DEPOSITOR.

1,374,881.  Specification of Letters Patent.  Patented Apr. 12, 1921.

Application filed December 8, 1919. Serial No. 343,158.

*To all whom it may concern:*

Be it known that I, JAMES P. COPELAND, a citizen of the United States, residing at Vinemont, in the county of Cullman and State of Alabama, have invented certain new and useful Improvements in Fertilizer-Depositors; and I do hereby declare the following to be a full, clear, and exact description of the invention, such as will enable others skilled in the art to which it appertains to make and use the same.

My invention relates to furrowing depositors or agricultural implements of a type adapted to open a furrow and insert fertilizer or seed therein. The object of my invention is to simplify, cheapen and render more efficient machines of this type that are adapted to be supported on one wheel and drawn over the ground while guided by the hands of a walking operator.

In the accompanying drawing.

Figure 1:
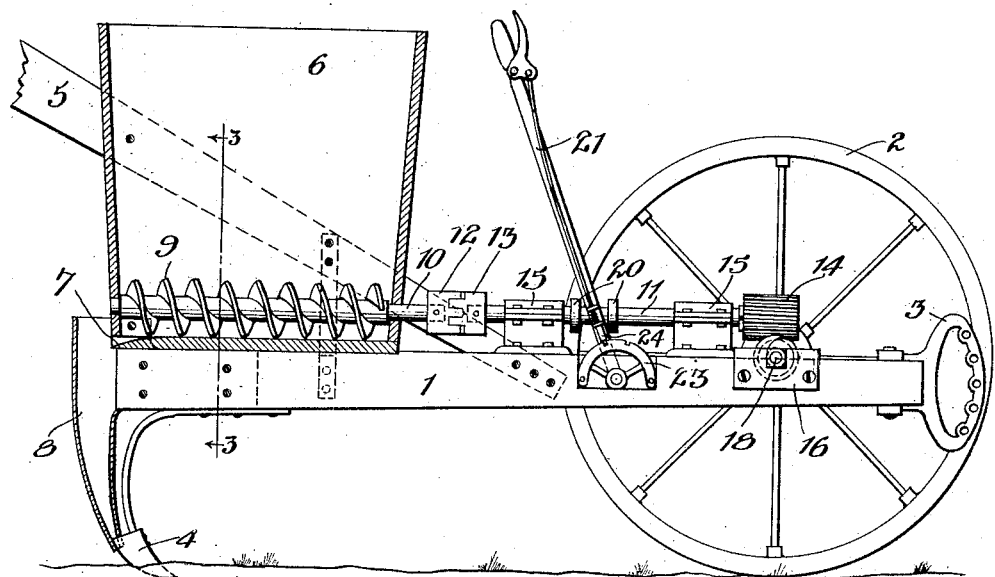
Figure 1 is a side elevation of my machine shown partly in section.
Figure 2:
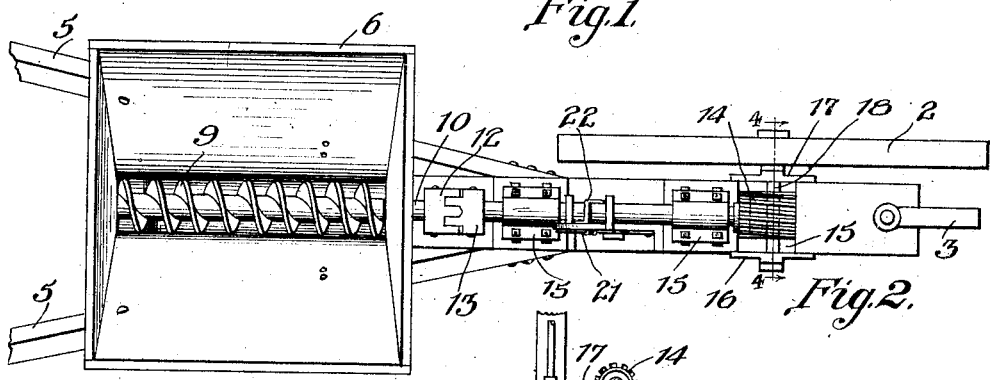
Fig. 2 is a plan view thereof.
Figures 3, 4:
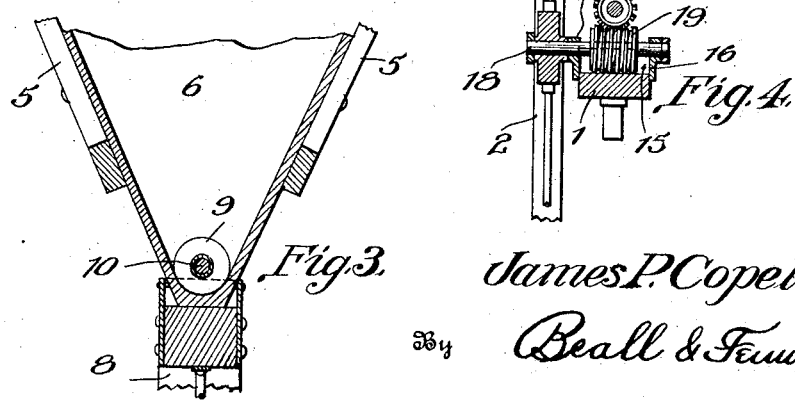
Fig. 3 is a section on line 3—3 of Fig. 1 through the hopper, feed screw and beam.
Fig. 4 is a detail section showing the driving gear and the manner in which a grease box is formed in the beam to keep the gear lubricated.

In the drawings numeral 1 represents a beam preferably made, for the sake of strength and cheapness, of hard wood. Journaled near the forward end of this beam is a ground wheel 2, and at the extreme forward end is a draft appliance of ordinary type designated 3. Bolted to the rear end of the beam 1 is a plow-point 4 designed for opening a furrow; 5 designates a pair of guiding handles bolted to the beam and adapted to be held by the operator. Seated on top of the beam 1 and held between the guiding handles 5, is a hopper 6, preferably formed of wood; and which may be lined with sheet metal. The sides of this hopper taper from top to bottom and at its bottom is a rounded groove. At the rear end of the groove is an outlet orifice 7 for discharging fertilizer or seed into a spout 8, which is adapted to direct said fertilizer or seed, at a point in the rear of the plow-point 4, into the furrow formed by said plow-point.

The contents of the hopper are continuously discharged during the operation of the implement by the rotation of a right handed screw conveyer 9 which fits accurately in the groove at the bottom of the hopper. The conveyer 9 is secured on a shaft section 10, journaled in the end-walls of the hopper 6, and the shaft section 10 is prevented from endwise movement by the ends of the conveyer thrusting against the inner faces of said end walls. In line with the shaft section 10 is a second shaft section 11 carrying at its front end a clutch member 13 which is adapted to interlock with another clutch member 12 on the corresponding end of the shaft section 10. The forward end of the shaft section 11 carries a spiral gear 14, and the shaft 11 is journaled in boxes 15 and is adapted to slide longitudinally therein.

As indicated at 15, in the upper side of the beam a gain or cavity is formed crosswise thereof; and the ends of the cavity are closed by strap boxes 16 and 17 bolted to the opposite sides of the beam. In the boxes 16 and 17 is journaled the axle 18 on which is secured the ground wheel 2 and a worm 19. The worm 19 runs within the cavity formed in the upper face of the beam and meshes with the worm wheel 14. Grease may be placed in this cavity and the worm gear kept properly lubricated. The form of the boxes reinforces the beam where it would be otherwise weakened by the gain. Obviously the gears may be covered to keep the dirt out.

A pair of spaced collars 20 is formed on or secured to the shaft 11. A lever 21 is pivoted on the beam and carries a laterally projected member 22 which is adapted to engage over the shaft 11 between the collars. A locking sector 23 coöperates with a latch 24 on the lever both of these being of usual form. By means of the lever the shaft may be moved endwise so as to couple or uncouple the clutch sections 12 and 13 when it is desired to start or stop the feed screw in the box 6. Owing to the fact that the gears 14 and 19 are of spiral type they do not obstruct the movement of the shaft section 11. This simplifies the construction of the clutch mechanism, and effects the greatest simplicity of the transmission.

It will be seen that the construction which I have described is very simple, strong and cheap to manufacture, and little likely to get out of order.

Having thus described the invention, what is claimed as new is—

1. In a furrowing depositor, a beam, a depositing hopper on said beam, means within said hopper for feeding material toward its discharge orifice, said beam having a transverse gain in its upper surface, bearing plates on the beam closing the ends of the gain, an axle journaled in the bearing plates, a ground wheel secured to the axle, a gear on the axle operating within the pocket formed by the gain and bearing plates, and transmission mechanism for the hopper contained feeding means operated by the gear.

2. In a depositor, a single beam, a depositing hopper on the rear end thereof, means within the hopper for feeding the contents toward the discharge orifice, a shaft section extending longitudinally above said beam, a clutch member at one end, for operating the feeding means, said shaft section having a second shaft section in line with said first mentioned shaft section having a clutch member adapted to engage said first mentioned clutch member, an axle journaled transversely on the beam, a worm thereon, a ground wheel secured to the axle, a cylindrical worm wheel on the second mentioned shaft section engaging said worm, and means to shift said second shaft section longitudinally.

In testimony whereof I affix my signature in presence of two witnesses.

JAMES P. COPELAND.

Witnesses:
 LARRY BLAND,
 BETTY BLAND.